United States Patent [19]
Turner

[11] 3,882,481
[45] May 6, 1975

[54] LOW VOLTAGE INDICATOR CIRCUIT

[75] Inventor: Robert Bruce Turner, Weymouth, Mass.

[73] Assignee: American Medical Electronics Corporation, Weymouth, Mass.

[22] Filed: May 30, 1974

[21] Appl. No.: 474,402

[52] U.S. Cl. ............... 340/336; 73/344; 340/248 B
[51] Int. Cl. .......................................... G08b 5/36
[58] Field of Search ........... 340/336, 248 A, 248 B; 73/344, 359, 362 R; 58/152 H, 23 BA

[56] References Cited
UNITED STATES PATENTS

| | | | |
|---|---|---|---|
| 3,505,804 | 4/1970 | Hofstein | 58/23 BA |
| 3,608,301 | 9/1971 | Loewengart | 340/248 B |
| 3,678,499 | 7/1972 | McCarty | 340/336 |
| 3,679,965 | 7/1972 | Wilkinson | 340/248 A |
| 3,755,806 | 8/1973 | Bunting | 340/248 B |
| 3,793,630 | 2/1974 | Meijer | 73/359 X |

*Primary Examiner*—David L. Trafton
*Attorney, Agent, or Firm*—Joseph S. Iandiorio

[57] ABSTRACT

An electronic system comprising a display circuit including at least two display units which are normally simultaneously enabled to display a character during an interval of operation of the system and a low voltage indicator circuit responsive to the supply voltage decreasing below a predetermined level for disabling at least one and less than all of the display units and preventing their display of a character during at least a segment of the interval.

8 Claims, 6 Drawing Figures

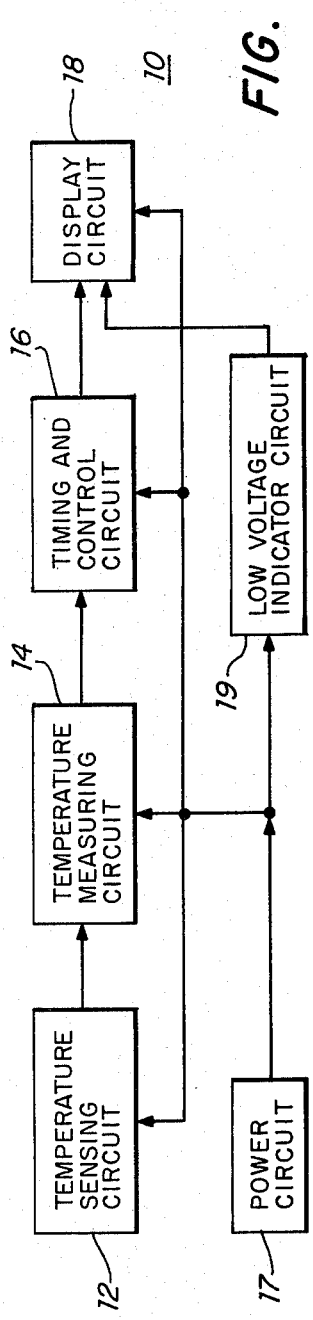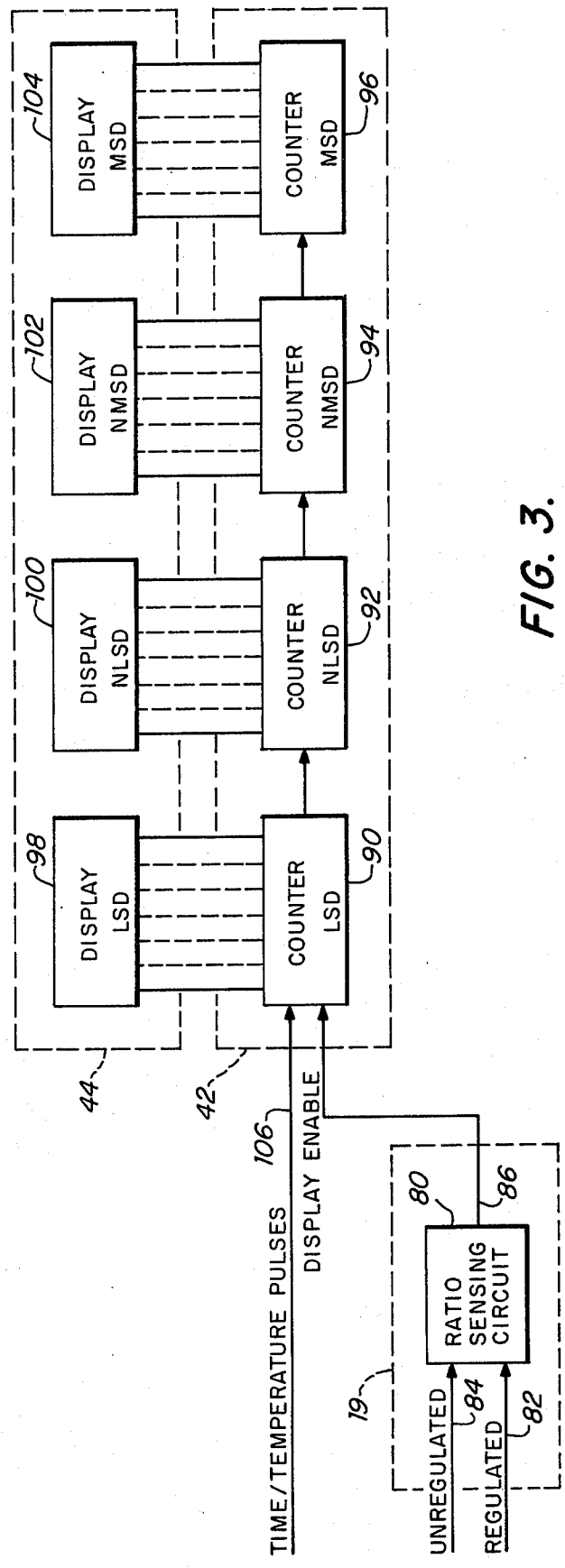

LOW VOLTAGE INDICATOR CIRCUIT

FIELD OF INVENTION

This invention relates to a low voltage indicator circuit which extinguishes a portion of a normally energized information display to signify low voltage of the power supply.

BACKGROUND OF INVENTION

Battery powered electronic systems are being used in increasing numbers for a wide variety of applications. For example, recent advances in technology have made more appealing the widespread use of electronic thermometers to measure temperature, especially in the medical field. Typically such systems include a thermometer unit and a temperature sensing probe unit which may be used with disposable covers. These systems are initially relatively expensive compared to mercury thermometers but over their useful life they cost considerably less to use and are less consuming of the time of scarce and expensive medical personnel. In these and other battery powered systems in which is it important to operate at proper voltage and to be forewarned that a power supply is dangerously low, monitoring circuits are used which actuate an alarm device such as an audible device or an indicator lamp. Ironically the energization of such devices further depletes the power supply and shortens the time remaining during which the system may be safely operated.

SUMMARY OF INVENTION

It is therefore an object of this invention to provide a low voltage indicator circuit which decreases rather than increases the burden on the power supply upon rendering indication that the power supply is depleted.

It is a further object of this invention to provide such a low voltage indicator circuit which extinguishes a portion of a normally energized information display to signify power depletion.

It is a further object of this invention to provide such a low voltage indicator circuit which extinguishes the least significant portion of a normally energized information display to signify power depletion.

The invention is featured for use with an electronic system including a display circuit comprising at least two display units which are normally simultaneously enabled to display characters during an interval of operation of the system. A low voltage indicator circuit is responsive to the supply voltage derived from the battery decreasing below a predetermined level for disabling at least one and less than all of the display units and preventing their display of a character at least during a segment of the operation interval.

In a preferred embodiment the low voltage indicator circuit is included in a battery powered electronic thermometer system which has a temperature sensing circuit for sensing variations in temperature and a temperature measuring circuit responsive to the temperature sensing circuit for providing a signal representative of the temperature measured. A display circuit including at least two display units which are normally simultaneously enabled to display the characters representing the temperature during an interval of operation of the system is provided. A low voltage indicator circuit responds to the supply voltage derived from the battery decreasing below a predetermined level to disable at least one and less than all of the display units and prevent the display of the temperature representing characters during at least a segment of the operation interval.

DISCLOSURE OF PREFERRED EMBODIMENT

Other objects, features and advantages will occur from the following description of a preferred embodiment and the accompanying drawings, in which:

FIG. 1 is a block diagram of an electronic thermometer system including a low voltage indicator circuit according to this invention;

FIG. 3 is a more detailed block diagram of the display circuit and low voltage indicator circuit shown in FIG. 2;

Figure 2:
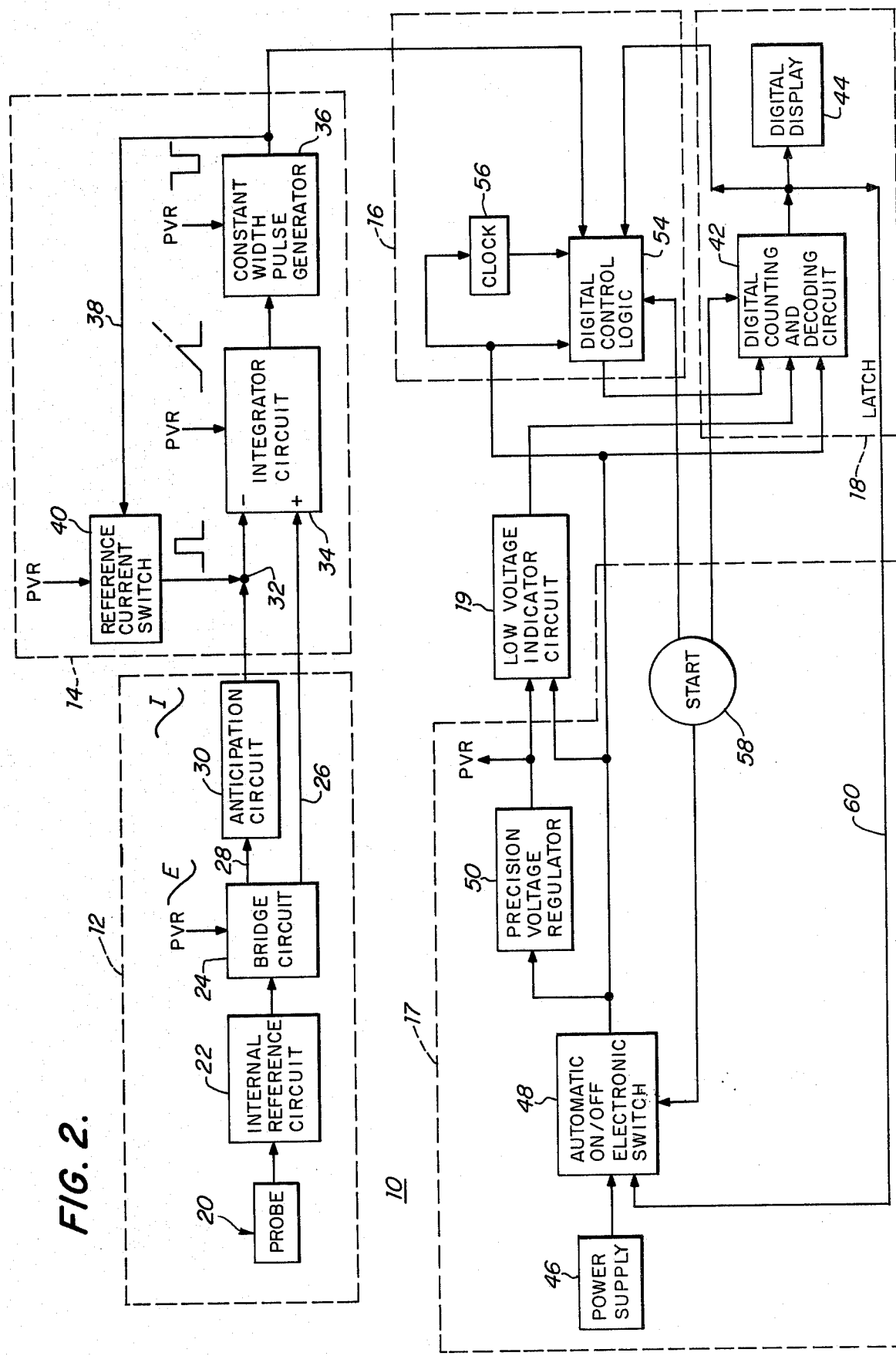
FIG. 2 is a more detailed block diagram of the system of FIG. 1.

The invention is adapted for use in a battery powered electronic system having a display circuit including at least two display units which are normally simultaneously enabled to display a character during an interval of an operation of the system. There is a low voltage indicator circuit responsive to the supply voltage derived from the battery decreasing below a predetermined level for disabling at least one and less than all of the display units and preventing their display of a character during at least a segment of the operation interval.

The low voltage indicator circuit may respond to a difference between unregulated supply voltage and regulated supply voltage or between supply voltage and a reference level or circuit. Alternatively, the low voltage indicator circuit may be a switching device which is actuated by depletion of the power supply voltage to provide a disabling signal to the display unit or units. Typically when used in an electronic thermometer system a low voltage indicator circuit is arranged to extinguish the least significant digit in the temperature display to attract attention to the fact that the power supply is depleted while maintaining an information display which is still meaningful to the user.

There is shown in FIG. 1 an electronic thermometer system 10 according to this invention including a temperature sensing circuit 12 which senses variation in temperature and provides a signal representative thereof to temperature measuring circuit 14 which provides a signal representative of the temperature sensed to timing and control circuit 16. Timing and control circuit 16 establishes an operation interval including a time mode period and a temperature mode period during which the time and temperature are displayed by display circuit 18. Timing and control circuit 16 generates pulses for measuring a fixed period of time during the time mode period and selectively provides at its output either those pulses during the time mode period or the signal measuring the sensed temperature during the temperature mode period. Power is provided to each of circuits 12, 14, 16 and 18 by power circuit 17. Low voltage indicator circuit 19 is responsive to a decrease in supply voltage to extinguish one or more but not all of the displays in display circuit 18 which normally display information representative of time and temperature.

In one specific embodiment temperature sensing circuit 12 may include a probe 20, FIG. 2, for sensing a temperature to be measured and producing an analog signal representative thereof which is submitted through internal reference circuit 22 to bridge circuit 24. Internal reference circuit 22 selectively connects a matching circuit to bridge circuit 24 in place of the input from probe 20 so that the accuracy and operation of the system can be verified. Bridge circuit 24 provides a reference output on line 26 and on line 28 provides a varying output as a function of the bridge imbalance representing the analog signal which is a function of the temperature sensed by probe 20. In this system used primarily to take the temperatures of humans the measurement range is from 90° to 110°F. Thus reference output 26 of bridge circuit 24 represents the level of 90°F; when output 28 of bridge circuit 24 is equal to reference output 26 thermometer probe 20 is measuring a temperature of 90°F. When output 28 is at a predetermined deviation from the level of output 26 probe 20 is measuring 110°F. Output 28 is fed to anticipation circuit 30 which senses the rate of change of the temperature being sensed by probe 20 and adds to the signal on output 28 from bridge circuit 24, thereby providing a signal at summing point 32 in voltage to rate converter 14 representative of the final value of the temperature being sensed in advance of the actual sensing of that final value.

In measuring circuit 14 the signal at summing point 32 is directed to the negative input of integrator circuit 34 whose positive input receives reference output 26 from bridge circuit 24. A difference between summing point 32 and reference output 26 at the input to integrator 34 causes it to provide a positive slope ramp at its output to constant width pulse generator 36, which provides a negative going pulse of fixed width when the ramp reaches a predetermined voltage level. The fixed width pulse is delivered along feedback line 38 to reference current switch 40 which produces a positive going pulse having fixed width and fixed amplitude and delivers it to summing point 32. The presence of this pulse restores summing point 32 to the level of output 26 causing the integrator circuit output to drop resulting in a sawtooth output signal. Constant width pulse generator 36 then produces no further pulses to reference current switch 40. Therefore no pulses are delivered to summing point 32 and the level at summing point 32 once again moves away from that at the reference output 26. This causes integrator circuit 34 to provide another positive ramp and the cycle to begin again. Since the pulses fed back to summing point 32 have fixed width and fixed amplitude it is the rate of those pulses which must adjust to the relative imbalance between summing point 32 and reference output 26. Thus the greater the difference between these two inputs to integrator circuit 34 the higher will be the repetition rate of the pulses provided at the output of constant width pulse generator 36 and this repetition rate is proportional to the temperature being sensed by probe 20. The illustrated configuration of measuring circuit 14 in FIG. 2 which includes summing point 32, integrator circuit 34, constant width pulse generator 36, feedback line 38 and reference current switch 40 is but one example of a voltage to rate converter which may be used. For example a voltage controlled oscillator or other means for producing an output whose frequency varies in proportion to an analog signal may be used.

Control and display circuit 18 includes digital counting and decoding circuit 42 which counts the digital pulses divided at the output of constant width pulse generator 36 and decodes that count to display the measured temperature on digital display 44.

All power to the system from power supply 46 is controlled by automatic on-off switch 48 which is turned on by actuation of start switch 58 and remains on independently of further operation of switch 58 until the operation interval including the time mode and temperature mode periods has ended and then automatically turns off. Precision voltage regulator 50 provides regulated voltage, PVR, to bridge circuit 24, reference current switch 40, integrator circuit 34, constant width pulse generator 36 and low battery voltage sensing circuit 52. The other input to low battery voltage sensing circuit 52 is the unregulated power supplied at the output of automatic on-off electronic switch 48. When the unregulated power supply voltage decreases to a predetermined level relative to the regulated voltage output provided by precision voltage regulator 50, low voltage indication circuit 19 provides a signal to digital counting and decoding circuit 42 causing it to extinguish the least significant digit of the temperature appearing in digital display 44.

Electronic thermometer system 10 operates in two modes: a time mode and a temperature mode. Digital control logic 54 supervises system performance in each of these modes and controls the transition between them. In the time mode digital control logic 54 passes time measuring pulses from clock 56 to digital counting and decoding circuit 42; while in the temperature mode digital control logic 54 directs temperature measuring pulses from constant width pulse generator 36 to digital counting and decoding circuit 42. The system is operated by actuation of start switch 58.

In operation when start switch 58 is actuated automatic on-off electronic switch 48 is turned on to supply power from power supply 46 to the rest of the system and digital control logic 54 and digital counting and decoding circuits 42 are reset. Probe 20 in contact with the patient whose temperature is to be measured begins to sense the temperature. The voltage E at output 28 of bridge circuit 24 decreases, increasing the negative current I at summing point 32. The difference in levels of output 26 and summing point 32 causes pulses to be generated at the output of constant width pulse generator 36 at a repetition rate required to restore summing point 32 to the proper level. The repetition rate of the pulses at the output of constant width pulse generator 36 stabilizes in a short period of time to represent the final value of the temperature being sensed. This time may be reduced still further by the use of anticipation circuit 30 as explained previously.

Simultaneously with this action, upon the actuation of start switch 58, automatic on-off electronic switch 48 is latched by a signal on line 60 from digital control logic 54 to sustain automatic on-off switch 48 in the on condition during the time and temperature mode periods. In this particular embodiment, the time mode period precedes the temperature mode period and their durations are typically 20 seconds and 10 seconds, respectively. Simultaneously with the actuation of start switch 58 digital control logic 54 passes clock pulses from clock 56 to digital counting and decoding circuit 42. These clock pulses may have a duration of 100 milliseconds so that a count of 10 such clock pulses by digital counting and decoding circuit 42 indicates 1 second. At the end of each second so accumulated digital display 44 is enabled to display the numbers 1 through 19 representing the time. At the end of the 20th second digital control logic 54 transfers the system into the temperature mode by permitting passage, for the period of 1 clock pulse, of the pulses at the output of constant width pulse generator 36 to digital counting and decoding circuit 42 which accumulates and decodes the count and causes the temperature to be displayed.

In one embodiment low voltage indicator circuit 19 includes a ratio sensing circuit 80, FIG. 3 which receives a regulated voltage at one input on line 82 and unregulated voltage at a second input on line 84. When the ratio of unregulated voltage to regulated voltage sensed by ratio sensing circuit 80 is sufficiently high the display enable signal is provided on output line 86. Display enable line 86 is provided to counter 90 in digital counting and decoding circuit 42 which includes three other counters 92, 94 and 96. Counter 90 represents the least significant digit, counter 92 the next to least significant digit, counter 94 the next to most significant digit and counter 96 the most significant digit. Each of counters 90, 92, 94 and 96 is associated with a display 98, 100, 102 and 104, respectively, establishing four display units in digital display 44.

Typically, in operation, pulses representing time are delivered on line 106 to counter 90 during the time mode period. During the time mode period counter 90, receives a display disabling signal from the timing and control circuit 16, which prevents its count from being displayed in display 98. Each time counter 90 counts ten full clock pulses of 100 milliseconds each representing 1 second, a signal is supplied to counter 92 which is enabled to display its count in display 100. Thus the first nine seconds are displayed in display 100 and the 11th through 19th seconds are displayed in displays 102 and 100. At the end of the time mode period, timing and control circuit 16 ceases delivery of the time measuring pulses and begins delivering the temperature measuring pulses on line 106 to counter 90 from which the display disable signal is removed at the end of the time mode period. Thus temperature measuring pulses counted by counter 90 are displayed directly in display 98 to indicate tenths of degrees of temperature. Temperatures from 90.0° to 99.9°F. are displayed in displays 102, 100 and 98 while temperatures from 100.0° to 109.9°F. require the additional display 104. During this temperature mode period while the temperature is being displayed a depletion of the power supply sufficient to trigger ratio sensing circuit 80 causes the display enable signal on line 86 to be removed so that the contents of counter 90 can no longer appear in display 98. The extinguishing of the character in display 98 during the temperature mode period when there should be a character appearing in display 98 provides an indication to the user that the power supply is seriously depleted but at least provides the user with a temperature reading to the nearest degree which is not as precise as would be obtained if display 98 were operating but is nevertheless useful in view of the circumstances.

Figure 4:
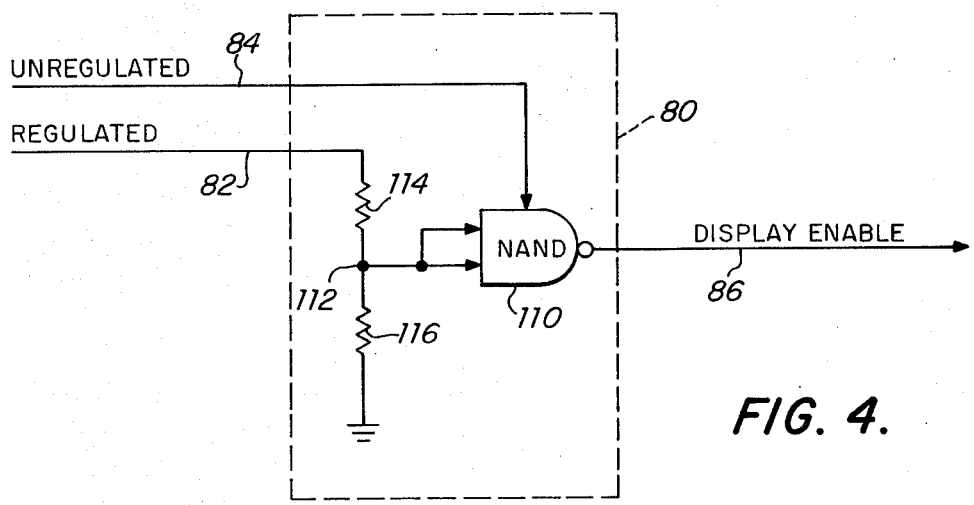
FIG. 4 is a schematic diagram of the low voltage indicator circuit shown in FIG. 3.

Ratio sensing circuit may include NAND gate 110, FIG. 4, having both inputs tied to the junction 112 of resistor 114 connected to the regulated power on line 82 and resistor 116 connected to ground. NAND gate 110 is typically a CMOS circuit which requires a threshold value voltage which is a fixed percentage of its supply voltage. The junction point 112 is set to a voltage level slightly less than threshold value required to keep the output of NAND gate 110 in the low state. For example, when NAND gate 110 is a CMOS circuit which requires a threshold voltage that is 50% of the supplied voltage and where it is desired that the unregulated supply should not be permitted to drop below 7 volts the junction 112 is set to a voltage slightly below 3.5 volts. Thus when the unregulated supply voltage on line 84 drops to 7 volts the junction 112 that is slightly less than 3.5 volts is above the 50% threshold level; the two high inputs to NAND gate 110 cause the output on line 86 to go low removing the display enable signal or conversely, providing a display disable signal on line 86 to counter 90 to extinguish the character appearing in display 98.

Figure 5:
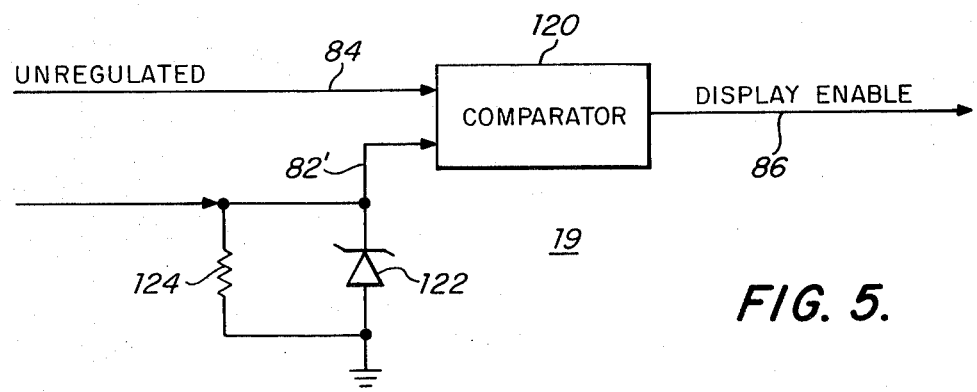
FIG. 5 is an alternative low voltage indicator circuit.

Alternatively low voltage indicator circuit 19 may include comparator 120, FIG. 5, which compares the unregulated power supply on line 84 with a reference level provided on line 82', for example, by Zener diode 122 and associated circuitry including resistor 124.

In operation, when the difference between the unregulated power supply on line 84 and the reference level supplied on line 82' reaches a predetermined differential a signal is supplied on line 86 to counter 90 to extinguish the character appearing in display 98.

Figure 6:
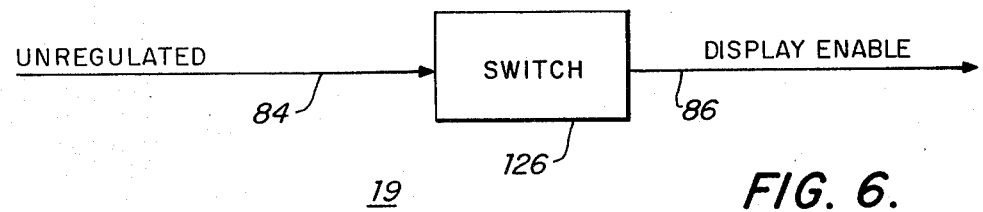
FIG. 6 is another alternative low voltage indicator circuit.

Alternatively, low voltage indicator circuit 19 may include a switching circuit 126, FIG. 6, which is normally held on to provide a display enable signal on line 86 but is switched off when the unregulated voltage on line 84 drops below some predetermined level whereupon the display enable signal on line 86 is removed and a display disable signal is provided on line 86 to counter 90 to extinguish the character appearing in display 98.

Other embodiments will occur to those skilled in the art and are within the following claims:

What is claimed is:

1. An electronic system comprising a display circuit including at least two display units which are normally simultaneously enabled to display a character during an interval of operation of the system and a low voltage indicator circuit responsive to the supply voltage decreasing below a predetermined level for disabling at least one and less than all of said display units and preventing its display of a character during at least a segment of said interval.

2. An electronic system comprising a display circuit including at least two display units which are normally simultaneously enabled to display a character during an interval of operation of the system; and a low voltage indicator circuit responsive to a supply voltage level and to a reference voltage level for producing an output in response to said supply voltage level decreasing below a predetermined value relative to said reference voltage level for disabling at least one and less than all of said display units and preventing its display of a character during at least a segment of said interval.

3. An electronic system comprising a source of regulated power; a source of unregulated power; a display circuit including at least two display units which are normally simultaneously enabled to display a character during an interval of operation of the system; and a low voltage indicator circuit including a ratio sensing circuit responsive to said source of regulated power and said source of unregulated power for producing an output in response to said unregulated power source voltage level decreasing below a predetermined value relative to said regulated power source voltage level for disabling at least one and less than all of said display units and preventing its display of a character during at least a segment of said interval.

4. An electronic thermometer system comprising a temperature sensing circuit for sensing variations in temperature; a temperature measuring circuit responsive to said temperature sensing circuit for providing a signal representative of the temperature measured; a timing and control circuit for establishing an operation interval including a time mode period in which a measured time is displayed and a temperature mode period in which a measured temperature is displayed and a display circuit including at least two display units which are normally simultaneously enabled to display a character during an interval of operation of the system, and a low voltage indicator circuit responsive to the supply voltage decreasing below a predetermined level for disabling at least one and less than all of said display units and preventing its display of a character during at least a segment of said interval.

5. The electronic thermometer system of claim 4 in which said segment is included in said temperture mode period.

6. The electronic thermometer system of claim 4 in which only said display unit representing the least significant digit is disabled during said segment.

7. An electronic thermometer system comprising a temperature sensing circuit for sensing variations in temperature; a temperature measuring circuit responsive to said temperature sensing circuit for providing a signal representative of the temperature measured; a display circuit including at least two display units which are normally simultaneously enabled to display a character during an interval of operation of the system, and a low voltage indicator circuit responsive to the supply voltage decreasing below a predetermined level for disabling at least one and less than all of said display units and preventing its display of a character during at least a segment of said interval.

8. The electronic thermometer system of claim 7 in which only the display unit representing the least significant digit is disabled during said segment.

* * * * *